US008760288B2

(12) United States Patent
Araiza-Boys et al.

(10) Patent No.: US 8,760,288 B2
(45) Date of Patent: Jun. 24, 2014

(54) REMOTE EVACUATION REPORTING INTERFACE FOR FIRST RESPONDER DUTY OPTIMIZATION IN THE FIELD

(76) Inventors: Susan Araiza-Boys, Redding, CA (US); Donald Robert Martin Boys, Redding, CA (US)

( * ) Notice: Subject to any disclaimer, the term of this patent is extended or adjusted under 35 U.S.C. 154(b) by 0 days.

(21) Appl. No.: 13/454,787

(22) Filed: Apr. 24, 2012

(65) Prior Publication Data

US 2013/0278420 A1 Oct. 24, 2013

(51) Int. Cl.

| | |
|---|---|
| ***H04W 24/00*** | (2009.01) |
| ***G06F 15/173*** | (2006.01) |
| ***G08B 29/00*** | (2006.01) |
| ***G08B 1/08*** | (2006.01) |
| ***G08B 23/00*** | (2006.01) |

(52) U.S. Cl.
USPC .................. 340/539.18; 340/506; 340/573.1; 340/539.13; 709/224; 455/456.3

(58) Field of Classification Search
None
See application file for complete search history.

(56) References Cited

U.S. PATENT DOCUMENTS

| | | | | |
|---|---|---|---|---|
| 6,677,894 | B2 * | 1/2004 | Sheynblat et al. | 342/357.46 |
| 7,091,851 | B2 * | 8/2006 | Mason et al. | 340/539.13 |
| 7,091,852 | B2 * | 8/2006 | Mason et al. | 340/539.13 |
| 7,248,159 | B2 * | 7/2007 | Smith | 340/539.13 |
| 7,277,018 | B2 * | 10/2007 | Reyes et al. | 340/573.1 |
| 2004/0145481 | A1 * | 7/2004 | Dilbeck et al. | 340/573.1 |
| 2005/0197775 | A1 * | 9/2005 | Smith | 702/3 |
| 2009/0163228 | A1 * | 6/2009 | Blumberg et al. | 455/456.3 |
| 2011/0047230 | A1 * | 2/2011 | McGee | 709/206 |
| 2011/0130636 | A1 * | 6/2011 | Daniel et al. | 600/301 |
| 2011/0314144 | A1 * | 12/2011 | Goodman | 709/224 |

* cited by examiner

*Primary Examiner* — George Bugg
*Assistant Examiner* — Renee Dorsey
(74) *Attorney, Agent, or Firm* — Donald R. Boys; Central Coast Patent Agency, Inc.

(57) ABSTRACT

A first responder task-optimization system includes a network-connected server having at least one processor and data repository, software running on the at least one processor from a non-transitory medium, the software providing a first function for receiving evacuation-success notification information from persons evacuating from pre-specified locations in the path of the progression of a disaster, a second function for associating the received evacuation-success notification information to the pre-specified locations on at least one digitally rendered geographic representation of the area in the path of the disaster, and a third function for serving the at least one geographic representation including the associated notification information to first responders in the field.

18 Claims, 3 Drawing Sheets

REMOTE EVACUATION REPORTING INTERFACE FOR FIRST RESPONDER DUTY OPTIMIZATION IN THE FIELD

BACKGROUND OF THE INVENTION

1. Field of the Invention

The present invention is in the field of disaster preparedness including search and rescue operations and pertains particularly to methods and apparatus for optimizing the efforts of first responders in the field during the progression of a disaster and after a disaster has unfolded.

2. Discussion of the State of the Art

In the field of disaster recovery, federal, state, and local governments have created contingency plans for preparing for and mitigating the effects of natural disasters such as hurricane, floods, fires, tornados, and other disaster types that might be envisioned by community planning personnel. One area of such planning is in the provision of early warnings to persons that are at risk in the occurrence of a disaster. Early warning types are generally specific to the type of disaster predicted and instructions for protecting oneself also vary with the type of disaster that is forewarned.

Current limitations with early warning systems are apparent with certain types of disasters. For example, tornado risk for an area may be predicted as much as days before the area is affected, however the exact locations, severity level, and time of occurrence of the possible tornados spawned by the system, if any, cannot be predicted until it is spotted by observers reading radar or spotting on the ground. In such cases, alerts may be propagated from weather emergency stations to sirens, mobile weather radios, televisions, telephones, and in some cases internet-connected computers. Other limitations in early warning scenarios include fast moving fires and flash flooding. Although general risk can be adequately predicted for general areas, immediate notification of events in actual progress is associated with much less time between the alert and the occurrence of the event.

Notwithstanding, many persons do not hear sirens or may not receive timely alerts due to many factors such as not having proper or working notification receiving appliances at hand, not hearing sirens, etc. Some persons hear general sirens and receive general alerts, such as county wide alerts, but do not take them seriously as these types of alerts are common when no disaster actually unfolds. Still, more persons who have received instructions for evacuating locations in the target of an unfolding disaster decide not to evacuate and prefer riding out the disaster in progress, often against recommendations of emergency personnel. This may occur even when mandatory evacuation orders are received.

In a system known to the inventor, fixed (hardwired) multi-disaster alarm units may be provided to individual residences, institutions, and other buildings that maybe occupied during the progression of a disaster. Such fixed units enable warnings based on the location information presented by the receiving devices, which is associated to and consistent with geographic location information of the building itself including GPS coordinate location information. Geo-specific information enables warnings to be propagated in a more granular and less general manner relative to an area. For example, warnings may be targeted to a subset or a group of residences in a neighborhood as opposed to simply receiving a countywide general warning.

Persons receiving more targeted alerts may take them much more seriously including following without hesitation any evacuation recommendations associated with such geo-specific warnings. However, many persons may still fail to evacuate, or may be unable to evacuate a location in certain circumstances. Such persons are at much higher risk of injury and death both during the disaster and post disaster when search efforts are underway in the area. First responders who are often the first personnel sent in to an affected disaster zone currently have no idea if there are persons at risk in or under debris resulting from destruction of buildings during the event. Consequently, the area is searched systematically, sometimes house by house and building by building. Priority is given to buildings such as schools, workplaces, malls, airports, or other locations where there might be numbers of injured persons waiting rescue. For residences, priority is given to those residences that were partially or wholly destroyed where persons may be trapped in the debris. The only intelligence leveraged by first responders is intelligence developed post disaster by manual and visual inspection as they move through an area.

Therefore, what is clearly needed is a first-responder resource optimization system that provides an early snapshot of where persons in the path of the disaster were just before the disaster unfolded. A system such as this can reduce the time and cost of rescue and recovery efforts by enabling prioritization of search and rescue efforts to locations were no pre-intelligence of the evacuation status of persons associated to those locations was received prior to or during the disaster.

SUMMARY OF THE INVENTION

The problem stated above is that better prevention of loss of life and injuries that may occur in the wake of a natural or human-caused disaster is desired in post-disaster recovery efforts, but many of the conventional means for reducing injury and loss of life in a disaster, such as random mobilization of search and rescue teams to search for injured persons that are still unaccounted for in the wake of the disaster causes delay in reaching injured persons marked by inefficiencies and uncertainties in the field. The inventors therefore considered functional components of a disaster preparedness system, looking for elements that exhibit interoperability that could potentially be harnessed to provide recovery intelligence in the field of the disaster, but in a manner that would not create delay or uncertainty relative to which locations should have priority for search and rescue in the recovery effort.

Every search and rescue operation is constrained by time, one by-product of which is the possibility that injured persons not found within an optional time frame will die of their injuries, adding to a death toll for the disaster. Most such disaster-spawned search and rescue operations employ teams of first responders organized by units to conduct the search and rescue efforts in a coordinated manner using communications and command facilities that are often set up in an ad-hoc manner or according to written preparedness plans drafted by the communities subject to the disaster.

The present inventor realized in an inventive moment that if, at the start of and during the unfolding of a disaster, persons at risk could report successful evacuations from affected residences, workplaces, and other institutions to a pre-designated information bank accessible to first responder teams in the field, significant streamlining of search and recovery efforts might result. The inventor therefore constructed a unique first responder optimization network for gathering intelligence before and during the unfolding of a disaster that allowed first responder units to see from a geographic perspective, which residences and other locations reported successful evacuations and which residences and other locations had not. A significant optimization of time and cost reduction associated with search and rescue operations results with no addition of first responder task load.

Accordingly, in one embodiment of the invention, a first responder task-optimization system is provided. The system includes a network-connected server having at least one processor and data repository, software running on the at least one processor from a non-transitory medium, the software providing a first function for receiving evacuation-success notification information from persons evacuating from pre-specified locations in the path of the progression of a disaster, a second function for associating the received evacuation-success notification information to the pre-specified locations on at least one digitally rendered geographic representation of the area in the path of the disaster, and a third function for serving the at least one geographic representation including the associated notification information to first responders in the field.

In one embodiment, the pre-specified locations are one or a combination of residences, workplaces, or institutions. In one embodiment, the evacuation-success notification information is received from fixed electronic interfaces associated with fixed, tethered, or mobile alarm systems. In a variation of this embodiment, the evacuation-success notification information is received from mobile communications appliances associated with persons, in turn, associated with the residences, workplaces, and institutions.

In one embodiment, the geographic representations are digital maps illustrating the pre-specified locations. In one embodiment, the second function associates the received notification information to the pre-specified locations in one or more digital overlays of the geographic representations. In a variation of this embodiment, the association is visual indicia overlaid one-to-one over the pre-specified locations on the geographic representations.

In one embodiment, the evacuation-success notification information is received in response to a mandatory or voluntary evacuation warning issued during the progression of the disaster. In a preferred embodiment, the evacuation-success notification information includes at least the number of persons evacuated from a pre-specified location. In a variation of this embodiment, the evacuation-success notification information further includes location information specifying locations and or areas to which the persons evacuated. In one embodiment, the locations are pre-specified by global positioning service (GPS) coordinates, wherein the GPS coordinates are implicitly observed or inferred through association of the location to one or a combination of telephone number, zip code, physical address, unit number, or alarm location.

According to an aspect of the present invention, a method is provided for optimizing search and recovery efforts for first responders to an area in the wake of a disaster comprising the steps (a) associating evacuation-success notification information received at a network-connected server having at least one processor and data repository from persons evacuating from pre-specified locations in the path of the progression of a disaster to the pre-specified locations on at least one digitally rendered geographic representation of the area in the path of the disaster, and (b) serving the at least one digitally rendered geographic representation of the area in the path of the disaster, the representation including the associated evacuation-success notification information to at least one network-connected computing appliance operated by first responders in the area affected by the disaster.

In one aspect of the method, in step (a), the pre-specified locations are one or a combination of residences, workplaces, or institutions. In one aspect, in step (a), the evacuation-success notification information is received from fixed electronic interfaces associated with fixed, tethered, or mobile alarm systems. In a variation of this aspect, in step (a), the evacuation-success notification information is received from mobile communications appliances associated with persons, in turn, associated with the residences, workplaces, and institutions.

In one aspect of the method, in step (a), the at least one geographic representation is a digital map illustrating individual ones of the pre-specified locations. In one aspect, in step (b), the received evacuation-success notification information is associated one-to-one to the pre-specified locations in one or more digital overlays of the at least one geographic representation. In a variation of this aspect, in step (b), the association is visual indicia overlaid one-to-one over the pre-specified locations on the at least on geographic representation.

In one aspect of the method, in step (a), the evacuation-success notification information further includes location information specifying locations and or areas to which the persons evacuated. In one aspect, in step (a), the locations are pre-specified by global positioning service (GPS) coordinates, wherein the GPS coordinates are implicitly observed or inferred through association of the location to one or a combination of telephone number, zip code, physical address, unit number, or alarm location.

BRIEF DESCRIPTION OF THE DRAWING FIGURES

DETAILED DESCRIPTION

The inventors provide a system for reporting successful evacuations from pre-specified locations such as residences and buildings during the progress or unfolding of a local or regional disaster. The present invention is described in enabling detail using the following examples, which may describe more than one relevant embodiment falling within the scope of the present invention.

Figure 1:
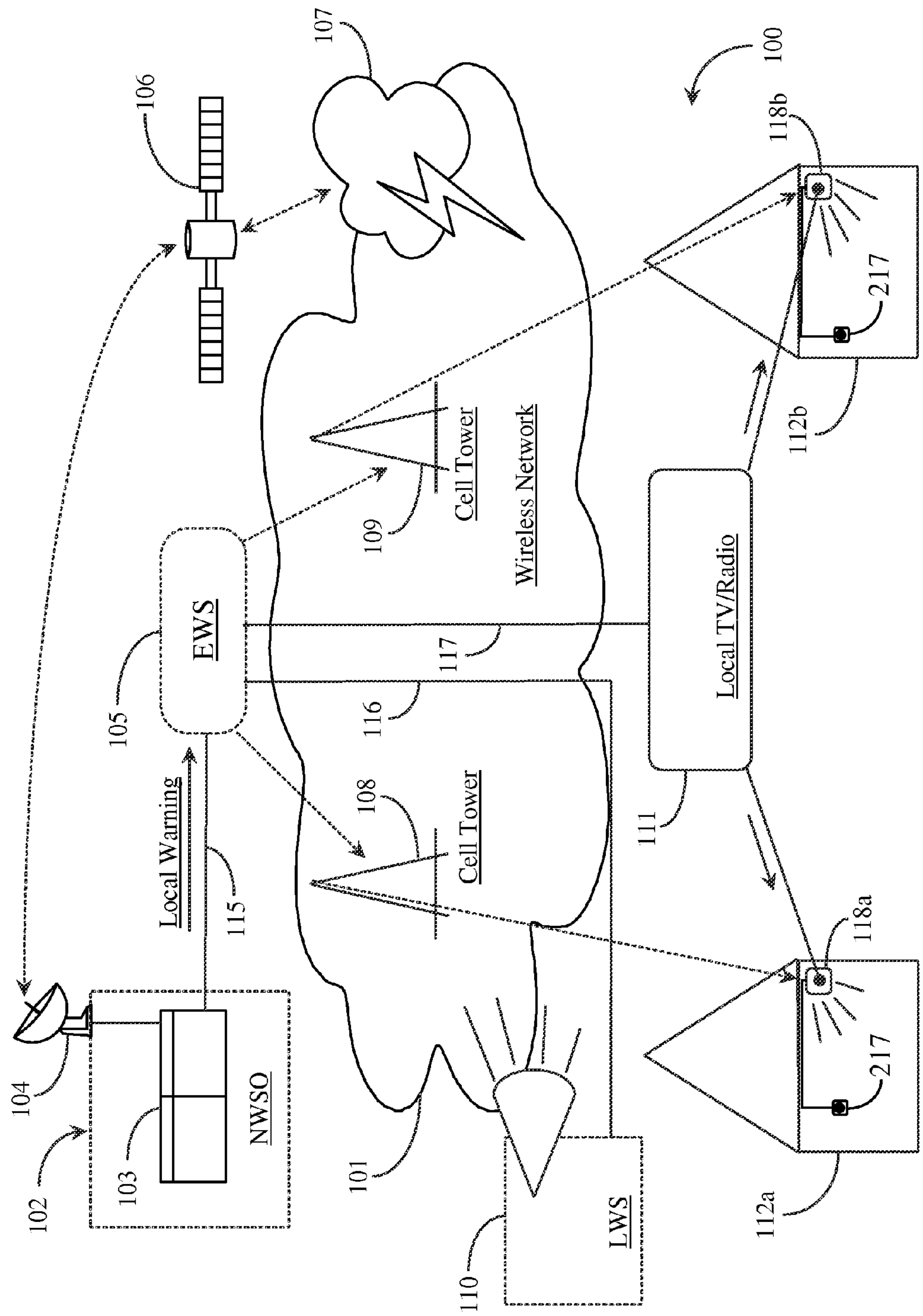
FIG. 1 is an architectural overview of an early warning network for broadcasting disaster alerts and that supports evacuation reporting according to an embodiment of the present invention.

FIG. 1 is an architectural overview of an early warning network 100 for broadcasting disaster alerts and that supports evacuation reporting according to an embodiment of the present invention. Network 100 is adapted to propagate a weather warning, or some other public warning to end devices and systems adapted to receive warnings and to alert people when some disaster is pending for a specific locality. Network 100 includes an early warning system (EWS) 105 adapted to receive information from a disaster monitoring service and to propagate or forward locally pertinent information to local stations for broadcast to end user devices.

In this example, a national weather service office (NWSO) facility 102 is illustrated as an example of an agency responsible for monitoring events that have a potential of causing localized disasters or other potential problem events and then providing emergency data to regional systems that might be affected by such an event. In this case, NWSO 102 monitors weather primarily, but may also provide warning information about flooding and fire. Other entities might be responsible for monitoring other types of emergency situations like terrorist activity or other forms of potentially disastrous emergencies.

In this example, the NWSO 102 is tracking a storm 107 via satellite 106. A receiver 104 provides information to entity 102 for emergency reporting. An information and alert server 103 is illustrated within facility 102 and is adapted to generate periodic reports, recommendations, watches and warnings that may be passed to EWS 105 over a network line 115. EWS is adapted as one of many possible local alert systems that may forward emergency information to appropriate networks for timely forward to localized entities. In this case, NWSO 102 has been tracking dangerous storm 107 and is providing data to EWS 105 over network line 115. Storm 107 may be a tornado, a hurricane, or another weather event or emergency deemed serious enough to report.

In current art, EWS sends storm watch and warning data to local television and radio stations represented herein as local TV/Radio station 111 over network line 117. Generally speaking, granularity with the EWS may be countywide meaning that when a localized alert is appropriate, it affects the entire county the emergency is detected in, or is moving to. Therefore, if storm 107 were a tornado, each county that would be affected in the tornado path would get broadcast warnings to both television and radio. However, if a warning is broadcast that is specific to one county, all of the other nearby counties may also receive the same alert or warning.

A wireless network 101 is illustrated in this example as one medium through which disaster alerts may be propagated. In this example, local station 111 broadcasts alerts or warnings over wire lines or wireless television to homes 112*a* and 112*b* representing neighborhood residences in the path of storm 107. In this example the warnings are received at local multi-disaster alarm units installed in the homes and integrated with the home electric wiring. Other devices including cellular telephones, landline telephones, computers, televisions and radios may receive warnings as well. A local warning siren (LWS) 110 is also connected to EWS 105 via network line 116. LWS 110 is typically a loud municipal siren that, when tripped, provides a very loud audible warning sound that may be heard throughout a local area under distress. LWS 110 may be activated during tornados, hurricanes, bombings, or other immediate disasters requiring people to take cover, evacuate the area, or to move to shelters.

One with skill in the art of emergency broadcast or alert systems will appreciate that in some cases, the current warning routes to end devices may be vulnerable to the effects of the disaster itself. In other cases, the timing of a disaster such as a tornado for example, may take place late in the evening or very early in the morning when most persons are sleeping. In this case, cellular telephones may be turned off, televisions may be turned off, computers may be turned off, and radios may be turned off. Depending on the proximity to LWS 110, a resident may not hear a warning while sleeping and therefore may be unprepared for the unfolding emergency. Likewise, if power is out due to the storm, televisions may not work. Cellular phones may also lose connectivity in a storm.

In this example, a multi-disaster alarm unit (MDAU) 118*a*, known to the inventor, is provided to and installed in home 112*a*. Likewise, a MDAU 118*b* is provided to and installed in home 112*b*. MDAU 118*a* and 118*b* is the same device and may be referred to as MDAU 118. Designation of 118*a* and 118*b* refers only to separate installations in the respective homes.

MDAU 118 is adapted to receive early warnings and alerts from EWS 105 and/or from station 111 as they might occur and to trigger a very loud audible alarm that can be easily heard anywhere on the property. In one embodiment, MDAU 118 includes a standard fire alarm and smoke-detection circuitry and can be used to replace a standard fire alarm. In this embodiment, MDAU 118 may further include poisonous gas sensors that are adapted to detect unsafe levels of carbon monoxide or methane gasses in a residence. In this case, MDAU 118 can forewarn of fire, unsafe gas levels, hurricane, tornado, flooding, tenor attack, or any other local disastrous event after receiving an alert or warning signal about the event from station 111 or EWS 105. Moreover, resident zip codes or other location information may be used in the determination of EWS or by station 111, which alarm devices, will actually receive warning signals. Furthermore, the alarm sound provided by device 118 may also include the nature of the impending event and instructions of which emergency plan or procedure to follow. For example, if the warning were a fast approaching fire then evacuation would be the plan whereas if a fast approaching tornado were the event, then taking cover or moving to a shelter might be the plan.

MDAU 118 may have cellular receiving circuitry provided thereto so that it may receive warning signals via wireless network 101 as illustrated by directional arrows between cell towers 108 and 109 and MDAU 118. MDAU 118 may also have radio circuitry provided thereto and adapted to receive signals from station 111. In one embodiment, MDAU 118 has both cellular and radio receiving capabilities. MDAU 118 uses alternating current or direct current from house wiring to stay powered on and set to receive alerts or warnings. MDAU 118 has a backup battery source that automatically takes over for the device should the power to the home be cut during a storm or other disaster. Unit 118 has certain advantages over mobile or tethered appliances including the fact that it is always on and listening for events and that minimum human interaction with the device reduces the possibility of compromise.

An advantage of device 118 over traditional warning receivers and transmitters is that it is always on and is in a fixed position like a standard fire alarm. In fact, the same device may forewarn all of the potential disasters without interrupting normal smoke detector and in house fire alarm procedures and/or detection of unsafe levels of gasses. Therefore, the device may also incorporate the standard fire alarm features and may be used in replacement of the existing fire alarms as an enhanced multi-disaster alarm system.

In current warning systems, messages and, or warning sounds and instructions may be locally broadcast to receiving radios and televisions. The problem is that the relevancy of the alert may not apply specifically to the locations receiving the broadcast. Such warnings are typically countywide warnings. The multi-disaster alarm unit 118 enables the local broadcast system to target individual units, or specific local groupings of units (118*a* and 118*b*) that are most affected by a given emergency. For example, a tornado moving north, north west would trigger alerts to pre-specified locations in the direct path of the storm as determined from a geographic perspective that is more granular than a county wide alert.

A warning may be targeted specifically to a group of units by consulting a location database of those receivers that are installed in a given area affected most by the emergency. As the emergency evolves to affect additional locations, those specific units may be alerted. For example, an alert may go out to units just ahead of a line of severe thunderstorms while units further ahead of the line are not yet alerted. This concept follows the logic that an alarm triggered by MDAU 118 is, by location, an immediate threat and therefore most likely to be taken seriously over a television announcement, for example, that is a more generalized alert. Therefore, the system of the invention allows more granularity with respect to targeting those most likely to be harmed in the situation at hand.

In this example, MDAU units 118*a* and 188*b* have a remote evacuation interface (REI) 217 provided and connected to respective alarm units by electric wire or cable. Remote evacuation interface 217 may be a manually operated button or lever protected from accidental triggering by a protective cover like glass. Each REI may be mounted on a wall in the home at a conveniently accessible location. REI 217 is adapted to enable reporting of evacuation-success notification information (ESNI) to a central server. The interface is only used when the occupants of the home are evacuating and reporting the successful evacuation from the residence subsequent to an alert received where an emergency evacuation is the recommended procedure. ESNI includes any prerecorded information pertaining to the people who live in and, or work at the pre-specified locations. ESNI data may be prerecorded so that when activating the interface, the recorded data is automatically sent over one or more communications channels accessible to the interface. The prerecorded ESNI may be periodically updated from time to time by data input interface or program recording to reflect changes in numbers and identifications of persons associated to the pre-specified locations.

REI 217 is connected to the alarm unit by a wire and when the homeowner breaks the glass or otherwise removes a protective cover and triggers the interface, a message, signal, or other indication is made from that host multi-disaster alarm unit to a central relay or server that documents the incoming notifications from the affected locations. REI 217 is an interface or tool to help first responders optimize their resources during search and rescue operations. For example, if storm 107 were a hurricane and evacuation was prescribed by emergency notification systems, then residents would activate their REIs when they are leaving their residences. The reporting process includes a central server or other receiving station (not illustrated) that would cover the regional area of one or more neighborhoods or geographic representations of the residences affected in the disaster. ESNI data may include the number of persons evacuated and their names, genders, and ages. Pets and farm animals may also be included in ESNI notification data in one embodiment.

It is noted herein that REI 217 functions to trigger a reverse notification from a GPS enabled device such as alarm unit 118. However, other devices may be used to physically send ESNI data to a central location for further processing without departing from the spirit and scope of the present invention. Other interfacing configurations for different types of communications devices are described later in this specification.

Figure 2:
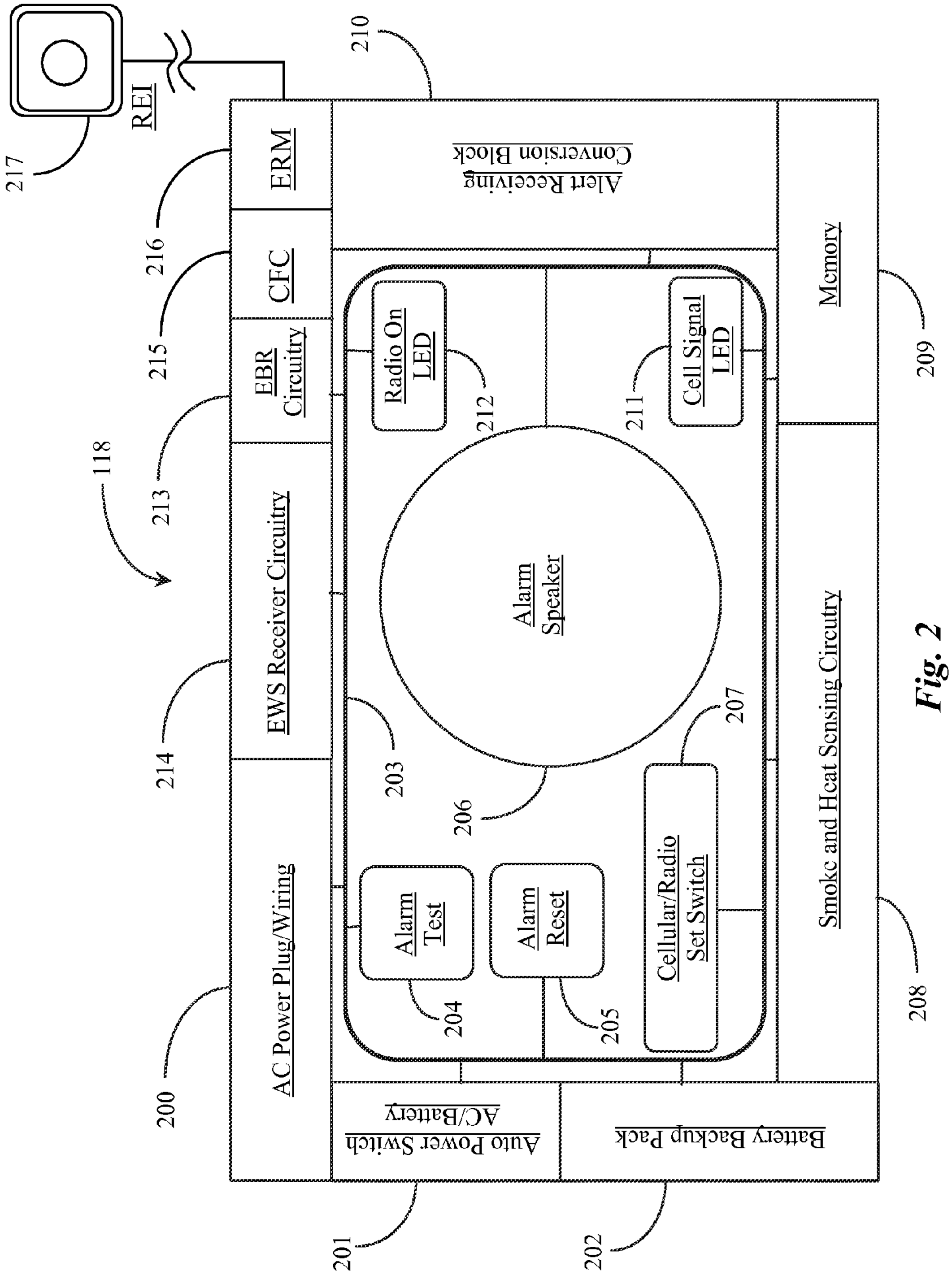
FIG. 2 is a block diagram illustrating basic components of a multi-disaster alarm integrated to a remote evacuation interface.

FIG. 2 is a block diagram illustrating basic components of a multi-disaster alarm integrated to a remote evacuation interface. MDAU 118 includes an AC power plug/wiring 200 for incorporation of the device on typical house electrical power. Power may also be DC in some embodiments. Power block 200 is, in one embodiment, the default power source. However, if a power outage occurs MDAU 118 may automatically switch to a battery power illustrated herein as battery backup pack 202. Battery backup pack 202 may contain a rechargeable battery cell or multiple batteries sufficient for powering the alarm and other circuitry components of the unit. In one embodiment where battery backup pack is rechargeable, it is always held in a charged state while AC or DC current is powering the system.

An automatic power-switching unit 201 is provided to MDAU 118 and is adapted to switch the power source from house electricity to battery in the event of an interruption of power. Likewise, if power is restored, switch 201 may automatically switch back to house electricity from battery backup. Power delivery components 200 and 202 are connected to a logical command and power bus structure 203 to enable power to system components and commands to be sent between components. Switch 201 is also connected to bus 203. Although it is not illustrated in this view, a sensor adapted to detect whether house electricity has been interrupted may be assumed present and may be implemented in AC power block 200.

MDAU 118 contains a smoke and heat-sensing block 208 adapted as normal in-home smoke and fire detectors circuitry. As is the case with all in-house fire alarms, block 208 activates when smoke or extreme heat is detected sounding an audible fire alarm, which may be played out through an alarm speaker 206. Although not illustrated herein, sensors for detecting unsafe levels of gasses may also be included without interrupting normal procedures for heat and smoke detection. Therefore, MDAU 118 functions in one embodiment as a standard fire alarm. An alarm-testing feature 204 and an alarm reset features 205 are provided for testing alarm function and audibility. External buttons on the housing structure of the unit (not illustrated) may activate features 204 and 205. There may also be an external display screen that displays information to a user such as which alarm features are being tested. MDAU 118 is a multi-disaster alarm; therefore, there may be more than one different audible alert or sound for any particular type alarm. For example, an in-home fire alarm may be a loud and constant screech while a local grass fire approaching may induce the same screech broken into a series of separate audible pulses. In this way, a user can instantly determine whether the fire is in the house or approaching the house. Likewise, other alarm sounds and presentations for other alarm types may be implemented. Audible digital files may be stored in and selected from a memory block 209, which is adapted to contain software, files, a software sound player and other required instruction and configuration files. In one embodiment, memory block 209 includes a telephone number or some other unique identifier that may be accessed to provide identification for receiving specific alerts.

In one embodiment, the alarm presentations are digital sound files that are selected and played over speaker 209 by player software installed in memory and executed according to the specific type of alert received. In this embodiment, a user that purchases a new alarm unit may program the unit for the emergencies that are likely to occur in their local area. In another embodiment, one or more mechanical dedicated alarms may be provided that may vary in sound output according to which alert type is received by the unit. For example, a single mechanical alarm and circuitry can produce more than one sound depending on which circuit of the alarm is implemented to sound the alarm.

MDAU 118 has an EWS receiving circuitry 214 provided thereto and adapted to receive TV and/or radio alerts or signals from an early warning system. In one embodiment, such warnings or alerts received by EWS block 214 may be parsed by an alert receiving conversion block 210. Block 210 may be a software or firmware adapted to parse radio or TV signals received for warning and alert codes converting those into alarm commands understood by the unit. The actual alert mechanisms received might be audible signals, parseable text, or recognizable voice. Some standard delivery of the warnings, alerts, watches, and so on may be practiced such as the well-known common access protocol (CAP) so that MDAU units receiving information may quickly utilize the data to trigger the appropriate alarm.

An emergency band radio circuitry block 213 is provided and may be adapted to monitor local emergency band fire, police, and other emergency transmissions. If a local emergency is unfolding, circuitry 213 may detect activity over the channel. Parsing capability may be utilized to decipher codes and other content spoken over a channel. In one embodiment, certain emergency codes or signals understood by MDAU 118 are created and propagated over various emergency band channels. Such codes or signals may be data or audible sounds, wavelengths, etc., adapted for the purpose of MDAU 118. Block 213 may be used in conjunction with block 210 to ensure that any information received is utilized according to the alarms protocols and rules.

In one embodiment, MDAU 118 may be adapted with cellular telephone answering capability. In this embodiment, cellular telephone receiving circuitry (not illustrated) may be provided and adapted to receive commands via a cellular telephone broadcast or a cell call placed to the unit. In the later case, a user might call the unit from a remote location and manually activate an alarm that might be heard by residents. Likewise, warning signals, data, or code might be received from an EWS via cellular network instead of by conventional radio or TV signal. A cellular/radio set switch 207 is illustrated in this example and is adapted to enable a user to set the unit to cellular alert or radio alert for receiving broadcast warnings. Indicator light emitting diodes (LEDs) may be provided to indicate receiving mode of MDAU 118. In this example, a cell signal LED 211 is provided and a radio on LED is provided.

In radio mode, MDAU 118 may monitor certain radio and/or television channels for emergency information. Likewise, Emergency Band Radio (EBR) circuitry 213 may be monitored simultaneously depending on the circuitry installed. In one embodiment, emergency broadcasts that include audible sounds, signals, and accompanying text may be parsed by MDAU 118 and converted to appropriate commands in block 210. In a preferred embodiment, the EWS may be provided with a coding system that can be understood by the unit and that does not interfere with normal radio and television reception. Such a coding system may include variant sounds, beeps, or frequencies that may be equated to various types of emergencies.

In one embodiment, MDAU 118 may be adapted with the capability of connecting to a WEB service hosted on a web server connected to a wide area network (WAN). Although not illustrated in this example, circuitry and software may be provided that may be adapted to monitor a special emergency server (URL) for any information that is updated to that server. Therefore, an update that may be an emergency pertinent to an MDAU unit may be pushed to the unit over an open and persistent connection to the network such as a digital subscriber line (DSL), broadband cable connection, or satellite.

MDAU 118 may be programmable, in one embodiment, to be adapted for alerting residents of different kinds of emergency situations. For example, a unit employed in an area devoid of hurricanes may not be programmed to warn of a hurricane. That is to say, the multi-disaster alarm may be pre-programmed to warn of emergency situations that typically occur in specific regions where the alarm might be installed. Flood alarm would be programmed for units installed in flood prone areas and so on. In a preferred embodiment, each MDAU may be mapped for location and uniquely identified so that in any given area only the homes subject to an emergency might receive alerts or warnings sufficient to trigger alarms. For example, units may be located by area codes or other telephone codes that give location information. In one embodiment, the units are pre-programmed for proper zip code. In still another embodiment, GPS coordinates might be used to map all of the units deployed so that they might be included in a planned emergency broadcast to a particular locality.

To exemplify a use case where local alarms may be triggered, consider a fast moving grass fire headed in a general direction. As emergency firefighters determine neighborhoods that are in the fires path, warnings may be broadcast over the local emergency band to those affected units triggering a fire threat alarm and a stored digital file that informs the residents that evacuation is suggested or ordered. In another case, residents living along a river may have units adapted for flood warnings. In this case, when water monitoring indicates a breech of flood stage for a certain section of the river, those units affected may be alerted via Web site, cell phone, radio, satellite, or emergency band to trigger an impending flood alert or alarm with a following audible or pre-stored voice file indicating what action may be appropriate based on the alert. Obviously if a dam breaks and the flooding is deadly then the most severe flood alert will sound with a voice recording triggered stating that immediate evacuation is ordered. If the flood is less severe, such as one or two feet above flood stage, then the alert might be less serious like a voice file that says stand by to evacuate and tune in to your local emergency network for more information.

There are many types of emergencies for which alerts may be propagated into affected homes and played over the alarm speaker 206 of MDAU 118. External fires, tornados, severe thunderstorms, tsunamis, potential mudslides, flooding, hurricanes, and other weather events may be forewarned and alerts received by affected MDAU units. Likewise, non-whether related emergencies might also be locally forewarned. Terror attacks, police pursuits, prisoner escapes, eminent plane crashes, and toxic spills or clouds affecting a local or region may be forewarned and alerts received by affected MDAU units.

In this example, REI 217 is illustrated and connects with an evacuation-reporting module (ERM) 216. ERM 216 contains all of the required circuitry for propagating a notification in the form of a parseable message or other indication to a centralized location such as a receiving or monitoring station that also has network connectivity to emergency responders in the field. ERM 216 reports successful evacuation notification information (ESNI) from the host residence or building subsequent to manual triggering of the REI in this particular example. MDAU 118 also includes a novel communication fail circuit (CFC) 215. CFC circuit 215 is adapted to trigger a general alarm if communication fails to the unit. For example, if no outside network is detected but the power is on, a general alarm may sound. Likewise, if communication is up but the alarm determination system or alarm media software fails, the general alarm will sound. It is also noted herein that the alarm system includes features for the disabled like vibration mechanisms or strobes for persons having disabilities.

Figure 3:
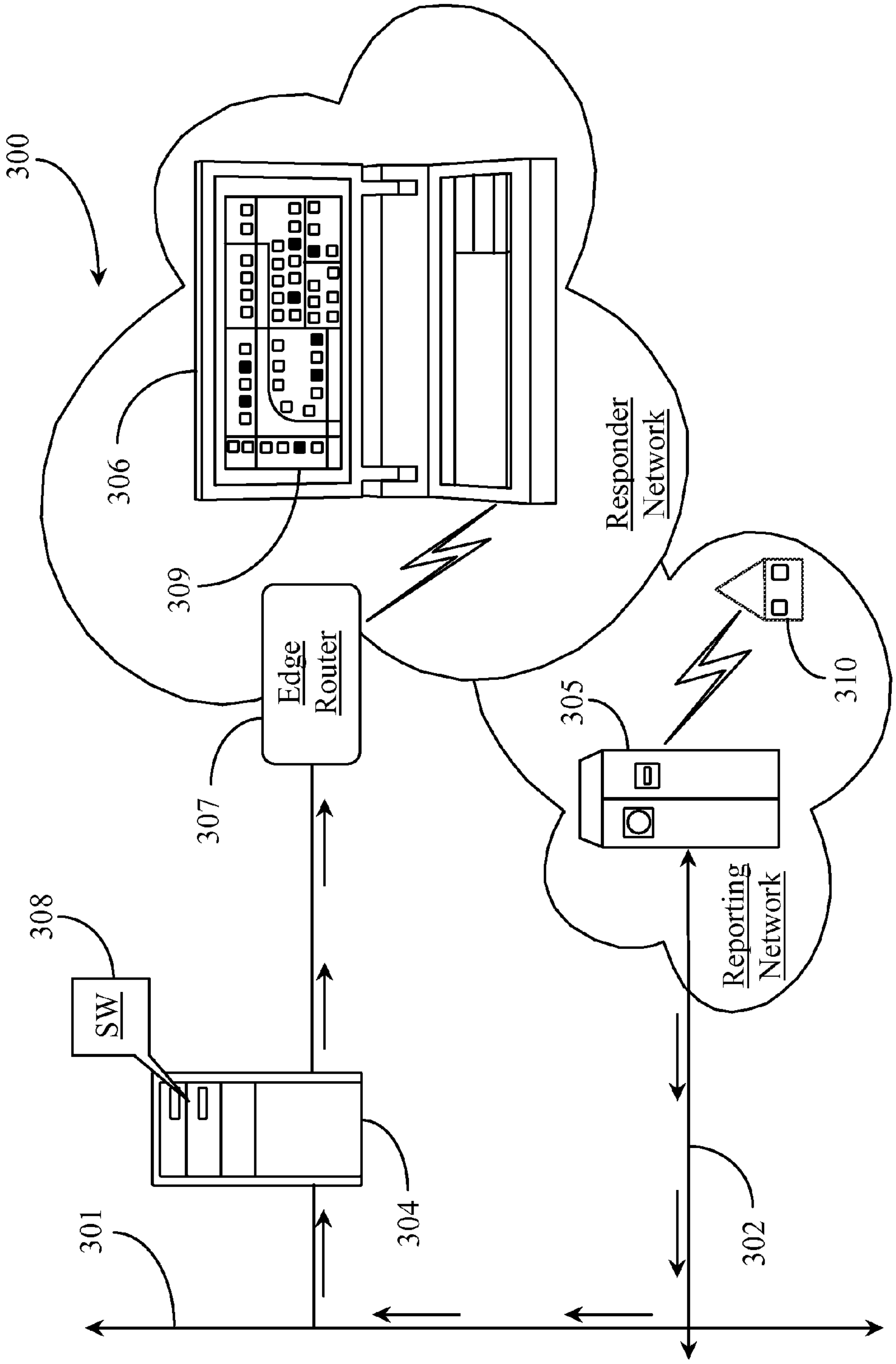
FIG. 3 is an architectural view of an emergency responder network.

FIG. 3 is an architectural view of an emergency responder network 300. Responder network 300 includes any communication network over which emergency responders in the field of a disaster may communicate and get directives and make reports. Network 300 includes a responder network denoted by a network cloud. An emergency responder may have one or more communications devices having a means for computing input and a means for display. An exemplary communication device is a laptop 306. Laptop 306 is a typical emergency responder and police tool. Cellular telephones with adequate displays may also be used to practice the invention.

A reporting network is also illustrated in this example and is represented by a network cloud. A home 310 represents a residence, building or other housing unit that one or more persons reside in or spend abundant time in. Home 310 is assumed to contain an alarm unit enhanced with a remote evacuation interface (REI) such as REI 217 of FIG. 1. A centralized reporting server 305 is provided and is connected to a data network 301 by way of a network access line 302. Server 305 includes at least one processor and a data repository. Network 301 is in one embodiment, the Internet network. Server or station 305 may be a network-connected node that covers a specified number of multiple disaster alarm units in the field. For example, one server like server 305 may cover a number of adjacent neighborhoods of a town while a number of other neighborhoods in the same town may be covered by a second server like server 305.

When an ESNI report is made from a residence, it is made when the last person in the home is evacuating so that report indicates that all of the residence of this home are successfully evacuated. Server 305 may forward this report or notification to a network-connected server 304. Network server 304 includes at least one processor and data repository. Server 304 includes a SW application 308 running on the processor from a non-transitory medium. SW 308 may be integrated with a geo-mapping software application that is accessible to all first responders in the field that have suitable communications devices like device 306. SW 308 includes at least a first function for associating ESNI from persons evacuating from pre-specified locations in the path of the progression of a disaster. SW 308 includes at least a second function for associating the received ESNI to the pre-specified locations on at least one digitally rendered geo-representation of the area in the path of a disaster. SW 308 includes at least a third function for serving the at least one geographic representation (Map) including the associated notification information to the first responders in the field. The maps containing the ESNI may be accessed on demand or may be pushed or assigned to specific responder teams or individuals.

SW 308 incorporates received evacuation-success notification information (ESNI) into geographic representations of areas affected by a disaster. SW 308 may arrange visual indication icons in a scaled overlay over a geographic representation such as a digitally rendered map of an area. The geo-graphic representations may be provided by a third-party that provides mapping services from satellite data. In one embodiment, SW 308 provides interactive icons that are embedded in the mapping overlay or in the original map data. These icons may change color if required. Interaction with an icon representing ESNI may cause a pop-up window or balloon containing additional information that the first responder can access such as location of an underground shelter or tornado room on the property. Such a shelter could be a safety hazard if covered in debris or rubble, etc. The first responder checking the property has access to such information that the residence owner has included in preparation of their ESNI well ahead of any disaster occurrence. The data may be stored in a text file, HTML file, an audio file, or in a message file.

In one embodiment where persons evacuate to a shelter or storm room on the property, the shelter location information may be reported in their ESNI. A receiver unit might be provided to be installed within the shelter or room and be connected by communications cable to a multi-disaster alarm unit such as unit 118 described in FIG. 1. In this case the alarm unit may receive an all clear signal from local officials, which in turn is relayed into the storm shelter notifying those inside that it is now safe to exit the shelter. In a variation of this embodiment, the persons exiting the shelter may activate a button or lever provided on the receiving unit that performs a transmit function to append ESNI information with data confirming well being and evacuation of the specific shelter location.

In one embodiment, the receiver in the storm shelter or storm room might be enhanced as a short wave radio receiver that, with the aid of radio receiver apparatus, could pick up an all-clear signal from an arriving first responder checking the property and the shelter location reported in the ESNI data for that property. In some cases, shelters and storm rooms are specially designed as thick reinforced steel or concrete structures where, from within, it might be difficult to pick up cellular or radio signals. However, cellular and radio receiving apparatus may be installed securely outside the shelter interior or storm room such as in a protected but open architectural feature provided as part of the shelter construction. The notification component in this case is a cabled peripheral that receives notification of the all-clear signal.

In one embodiment, a transmit function such as a button can be used to confirm receipt of the all-clear signal by sending a radio or cellular signal back over the cable via the radio or cellular apparatus installed just outside the shelter interior. The confirmation may also indicate that the persons are now exiting the shelter. This data may be appended automatically to their ESNI so that another responder does not check the property again after it has been cleared. On an updated map, the new ESNI can be accessed as described further above. The next responder can mouse over the icon or click on the icon associated with the ESNI and see that the shelter is no longer occupied.

The first responder that accesses or receives a map depicting the immediate area may go offline and still have the visual indication of evacuation status of the residences, or other buildings. If connected to the server, the responder may access additional information by interacting with the icons representing ESNI. In one embodiment SW 308 may be integrated with a voice navigation service that helps the first responder get to each GPS coordinate that correlates to a pre-specified location that has not reported evacuation status. Such a specialized service could utilize near real time satellite imagery of the immediate area of a first responder to suggest the best routes to search targets including aiding the responder from an aerial perspective to avoid roads that have fresh debris such as a downed tree that would make the road impassable.

In this example ESNI is received from persons evacuating from pre-specified locations that may be in the path of a disaster. ESNI may be sent from persons under voluntary evacuation orders or mandatory evacuation orders. In one embodiment, persons may evacuate when there are no explicit orders or warnings for doing so relative to any particular disaster type. For example, a person may determine to evacuate a home in the path of a flood or fire where no formal orders have yet been issued for that evacuation. It is noted herein that server functions of server 305 and 304 may be combined on one machine without departing from the spirit and scope of the present invention.

SW 308 associates received ESNI from pre-specified locations to those same locations represented on a digitally rendered map. SW 308 may include overlay functionality that provides at least visual information such as in an overlay over a relevant digitally rendered geographic representation of a local or regional area affected by a disaster where such representations are available to first responders rolling into the relevant areas in the wake of the disaster. In this case, pre-specification is by fixed alarm device such as an alarm hard-wired to the structure. In this case, every deployed alarm unit in the field is pre-specified by mapped location such as GPS coordinate. In this way, a digitally rendered grid-like map (geographic representation) of any general location is available to first responders that includes the evacuation-success notification information (ESNI) overlaid one-per-one over the affected homes, residences, buildings, or other habitable structures that may house potential evacuees prior to evacuation.

A display of a geographic representation is illustrated in this case as a neighborhood map 309 presented in display on laptop 306 of any first responder who has accessed the map or perhaps has been assigned to an area and therefore automatically gets the associated map or maps. The map clearly illustrates streets and residences that are equipped with the alarm system and remote evacuation interface. Homes on the map that have reported a successful evacuation by sending ESNI may light up via a colored icon or colored property boundary in presentation display indicating to a first responder that the homes do not need to be checked for occupants.

The visual indicia in this case are readily visible and are indicative of a successful evacuation for each lit-up residence home or institution. In this way, first responders may proceed directly to homes that have not reported to be evacuated (homes that have no indication of successful evacuation). Such an optimization reduces the work of first responders dramatically and improves overall chances for successful recovery and rescue of those who need help. In one embodiment, the visual indicators are icons that may be expanded by moue click or other input means available to reveal additional information such as number of residents, ages, genders, names, current location information, for example, a local community shelter, etc.

In practice, a person evacuating from residence 310 breaks the glass on the REI and presses the button or throws the lever or switch. A message, signal, or other indication is generated on the host alarm device and then propagated to reporting or relay server 305. The message (ESNI) specific to that alarm unit is propagated from server 305 over network line 302 and network 301 to first responder control server 304 running SW 308, which may include a geo-mapping SW adapted to serve digitally rendered geographic representations (maps) of areas affected by the disaster. Server 304 updates the current mapping for the reported location and adds the information to the mapping that first responders access or are served. Thus, while out in the field, the first responders can access or be served a local mapping of a neighborhood and see which homes do not need to be immediately checked by the fact of their indications of successful evacuation.

In one embodiment, ESNI includes the number of persons successfully evacuated from a pre-specified location and specification of one or more areas or locations to which the persons evacuated. In one embodiment, a version of SW 308 may be provided to responders charged with animal recovery and rescue. In this case the animal specific ESNI may be separated from the ESNI of the family or caretakers of those animals. ESNI data for animals may include animal type, animal name, and where the animals were evacuated. In one embodiment, ESNI data may be altered to reflect changes before the notification is sent from a pre-specified location. For example, a flood event may occur at a time when some persons are home but other persons associated with the residence are at work or school. In this case, the ESNI may be altered to reflect that at evacuation time (the time the message is sent) the husband was at work and the child was at school. The final visual indication for a first responder might indicate a possibility that the husband or child might have arrived at the residence after the wife and another child successfully evacuated. Such an evacuation notification may receive a higher priority for search post disaster than ESNI indicating a full accounting of all persons associated to the residence.

A color code may be used in overlay on digitally rendered geo-mappings of the area to reflect such priorities mentioned further above. For example, green may be associated with a successful evacuation where all are accounted for in the physical evacuation. Yellow may be associated with a successful evacuation that does not account for everyone associated with the physical evacuation because they were not there at the time of the physical evacuation. Orange may be associated with a successful evacuation performed from a remote location because it was believed that no one was at the residence at the time of the disaster. Red may be associated with a residence for which no data was received indicating an unsuccessful evacuation.

Responders would first direct recovery efforts to residences showing red on the map, then orange, followed by yellow and finally green. In this way those residences most likely to harbor persons that are at risk of injury and death are searched first before residences that have lower probability of harboring persons as indicated by color. In a preferred embodiment, the geographic representations of the areas are digital maps rendered by a mapping service that obtains the mapping information from satellite information. In this case, SW 308 may update ESNI data in real time as first responders clear areas. When first responders clear a property, the responder may report the fact as an ESNI update for that property (GPS). SW 308 may receive the new ESNI and indicate the update by graying out the icon on future maps indicating that it has been checked. As responders work through an area performing rescue operations and recovery duties, ESNI data may be updated with the results of their efforts in near real time. This may prevent redundancy in the field such as a residence being searched more than once by different responders.

Referring now back to FIG. 2, it will be apparent to one with skill in the art that ERM 216 may be enabled by receiving circuitry to receive a successful evacuation signal remotely, such as from a cellular telephone or a network-connected computing appliance like an iPad, Android device, or some other wireless computing appliance. In this case, an application may be provided to reside on and execute from a user's appliance that brokers communication between the user operating remotely, and ERM 216. ERM 216 may receive a successful evacuation signal, message, command, or other indication over a network from the user's computing appliance instead of from physical activation of REI 217.

It is duly noted herein that having a fixed interface such as REI 217 is not specifically required to practice the present invention. In one embodiment, it is not required to have a fixed multi-disaster alarm unit in the residence or building to be pre-specified for inclusion in a geo-map rendering that includes ESNI. In one embodiment, reporting address or pre-known GPS coordinates associated with the property is sufficient to be included in the evacuation mapping data. For example, a family using a NOAA whether radio may receive a disaster alert or warning for their general area where such alert recommends evacuation. The family may use a cellular telephone, landline, or any other communications device to report ESNI to server 305. However, a fixed interface is preferred in some embodiments because of the propensity for making mistakes using a mobile device. GPS data may be implicitly observed data associated with a fixed residence or that GPS data may be inferred through association of the location to one or a combination of telephone number, zip code, physical address, unit number, alarm location, or other triangulation methods.

To further explain, a father in the workplace could use a mobile phone to report ESNI for a family at a pre-specified location based on a call from one or more family members to the father that the evacuation has occurred. However, this is somewhat less reliable than physically leaving the home and knowing that all are evacuated and none will arrive at the residence that has already reported evacuation. Therefore, some formal protocols and rules might be observed to facilitate ESNI with high integrity for the data.

In one embodiment, a family faced with recommended or mandatory evacuation orders during the unfolding of a disaster may forget to activate REI 217 after having successfully vacated the residence. In that case, ERM 216 may be activated to report a successful evacuation for the residence or building remotely by landline, cell phone, or by computing appliance. ERM may, in one embodiment, be dialed from a telecommunications device or application. In this same embodiment, ERM might also receive and parse a text message. In this way, persons who have successfully left the area of a disaster without physically activating REL 217; or, persons that were not at home, and knew the home was not occupied during the unfolding of the disaster could report that their residence was empty at the time of the disaster. In one embodiment an NOAA whether radio may be enhanced with the provision of a ESNI transmitter (TX) function and may be GPS identified to a pre-specified location. Thus, a family that successfully evacuates may press a special button provided on the NOAA weather radio that might have to be physically activated (one time) in similar fashion as a fire/glass alarm interface so that unintended activation of the interface does not occur.

Referring now back to FIG. 3, a first responder operating laptop 306 running application 308 may call up a map 309 of an immediate area such as a neighborhood and may see which residences were evacuated successfully before the disaster struck. This is analogous to obtaining a snapshot of where people were just before the disaster hit. If the devastation is such that many homes are destroyed in the neighborhood, map 309 provides the last visible snapshot of the evacuation status per residence location. The first responder may use this knowledge to prioritize a search and rescue operation by directing that homes or remnants thereof such as piles of rubble and debris at those home locations showing no successful evacuation be searched to look for survivors before homes or remnants thereof such as piles of rubble and debris at those home locations showing successful evacuation reports. Such optimization cuts cost and effort in the search for survivors after a disaster has occurred.

In the case of enhancement for remote activation of ERM 216 (FIG. 2) described further above, there may be a provision for defining a residence as empty or not occupied during the unfolding of the disaster. In such a case, a separate indication may be used on the geographic map of those residences that differentiates them on the map from those residences that show successful evacuation through physical activation of REI, and from those residences that do not show a report. The residences that did not report are given the highest priority in search and rescue attempts followed by the residences that were reported empty, or not occupied.

In a preferred embodiment of the present invention, the first responder application 309 would be available only to documented first responders such as civil servants, volunteers, national guard, military and police, and other persons known to provide first responder services. This aspect of implementation prevents potential looters from accessing the knowledge provided by application 308 that areas of the neighborhood such as specific home locations are empty (evacuated). However, there may be provisions instituted by local regions or communities that permit access to first responder application 308 to certain neighborhood watch organization members or commanders, homeowner association members or officials, school officials, mail workers, security guards, or other documented workers in civil service, public service, or volunteer positions.

In still another embodiment of the invention, a protocol extension may be made for residences that use a storm shelter located on their property. For example, if the family evacuated the home into an underground or nearby storm shelter or room such as may be the case of a tornado, the evacuation report may contain an indication that there is a storm shelter or room on the property and that the family is in the shelter. In one embodiment, REI 217 of FIG. 2 may be located within the storm shelter or room and may be activated when everyone is safe inside the shelter. In a variation of this embodiment, a receiving unit may be integrated with the report evacuation interface (REI). In this case, an all clear signal sent by the NWS or other reporting authority may be picked up by the homes alarm and relayed to the REI unit receiver inside the storm shelter. In this way persons within the shelter may know when they might venture out after the danger from the disaster has passed or expired.

In a preferred embodiment, persons affected by a disaster where no evacuation is called for may still report ESNI if they have voluntarily evacuated. In future state-of-art tornado alert systems, additional information known to the spotters and weather reporters such as the current or potential strength of the system may cause evacuation recommendations to be appended to tornado warnings in certain areas, such warnings played over radio or television or received by desktop alert, may recommend evacuation rather than staying in a basement, closet, or other structurally sound room, which is typical instruction for potential tornado victims. Disasters where evacuations are commonplace include floods, fires, hurricanes, tsunamis, and some landslide situations.

In one embodiment, seniors and disabled persons not having the ability to use communications devices can have an alert transmission mechanism such as a life alert mechanism or other push button alert device can trigger a successful evacuation report with little modification to the wearable device. In such a case, a disabled person in a wheel chair can leave with a neighbor, for example, and push a button on the mechanism that communicates the successful evacuation from the residence of that person. For intuitions, triggering evacuation of hospital patients, disabled persons nursing home residents, and the like may be handled by evacuating staff.

In one embodiment the evacuation interface may be structured to have more than one button or lever each indicating a different level of ESNI. For example, a green evacuation button or lever may be operated when it is known that all of the residents of the institution have been accounted for and are evacuated. A yellow button or lever on the same interface may be triggered to indicate that while all residents who were physically at the location have evacuated, one or more residents that live there were not at the location at the time of evacuation, implying a slight possibility that the resident or residents might have come back to the location sometime after the evacuation but before the disaster unfolded.

It will be apparent to one with skill in the art that the evacuation reporting system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A first responder task-optimization system comprising:

a network-connected server having at least one processor and data repository;

software running on the at least one processor from a non-transitory medium, the software providing:

a first function mapping fixed geographic locations housing fixed electronic devices having interfaces connected to fixed alarm systems at the geographic locations;

a second function receiving evacuation-success notification information manually sent from persons interacting with the electronic devices evacuating from the geographic locations in the path of the progression of a disaster;

a third function for visually associating the received evacuation-success notification information to the geographic locations visually represented on at least one digitally rendered geographic representation of the area in the path of the disaster, the evacuation-success notification indicating that the persons are no longer present at the location; and a fourth function for serving the at least one geographic representation including the associated notification information to first responders in the field.

2. The system of claim 1, wherein the pre-specified locations are one or a combination of residences, workplaces, or institutions.

3. The system of claim 1, wherein the evacuation-success notification information is received from mobile communications appliances associated with persons, in turn, associated with the alarm systems at the geographic locations.

4. The system of claim 1, wherein the geographic representations are digital maps illustrating the geographic locations.

5. The system of claim 1, wherein the second function associates the received notification information to the-geographic locations in one or more digital overlays of the geographic representations.

6. The system of claim 5, wherein the association is visual indicia overlaid one-to-one over the geographic locations on the geographic representations.

7. The system of claim 1, wherein the evacuation-success notification information is received in response to a mandatory or voluntary evacuation warning issued via the fixed electronic device during the progression of the disaster.

8. The system of claim 1, wherein the evacuation-success notification information includes at least the number of persons evacuated from a geographic location.

9. The system of claim 8, wherein the evacuation-success notification information further includes location information specifying locations and or areas to which the persons evacuated that are remote from the geographic locations housing the electronic devices.

10. The system of claim 1, wherein the geographic locations are pre-mapped by global positioning service (GPS) coordinates prior to the disaster, wherein the GPS coordinates are implicitly observed or inferred through association of the location to one or a combination of telephone number, zip code, physical address, unit number, or the alarm system location.

11. A method for optimizing search and recovery efforts for first responders to a geographic area in the wake of a disaster comprising the steps:

(a) mapping geographic locations housing fixed electronic devices having interfaces connected to fixed alarm systems at the geographic locations;

(b) receiving evacuation-success notification information manually sent from persons operating the interface, at a network-connected server having at least one processor and data repository, said persons evacuating from the geographic locations in the path of the progression of a disaster;

(c) associating the received evacuation-success notification to the geographic locations visually represented on at least one digitally rendered geographic representation of the area in the path of the disaster, wherein the received evacuation-success notification indicates persons no longer present at the geographic location; and (d) serving the at least one digitally rendered geographic representation of the area in the path of the disaster, the representation including the associated evacuation-success notification information to at least one network-connected computing appliances operated by first responders in the area affected by the disaster.

12. The method of claim 11, wherein in step (a), the geographic locations are one or a combination of residences, workplaces, or institutions.

13. The method of claim 1, wherein in step (b), the evacuation-success notification information is received from mobile communications appliances associated with persons, in turn, associated with the alarm systems at the geographic locations.

14. The method of claim 11, wherein in step (a), the mapping includes at least one geographic representation is a digital map illustrating individual ones of the geographic locations.

15. The method of claim 11, wherein in step (c), the received evacuation-success notification information is associated one-to-one to the geographic locations in one or more digital overlays of the at least one geographic representation.

16. The method of claim 11, wherein in step (c), the association is visual indicia overlaid one-to-one over the geographic locations on the at least on geographic representation.

17. The method of claim 11, wherein in step (b), the evacuation-success notification information further includes location information specifying locations and or areas to which the persons evacuated.

18. The method of claim 11, wherein in step (a), the geographic locations are mapped by global positioning service (GPS) coordinates, wherein the GPS coordinates are implicitly observed or inferred through association of the location to one or a combination of telephone number, zip code, physical address, unit number, or the alarm system location.

* * * * *